April 12, 1966 J. W. WETZEL 3,246,122
TEMPERATURE CONTROLLED SURFACE HEATING UNIT
Filed Nov. 29, 1963

INVENTOR.
John W. Wetzel
BY
Andrew G. Ahrmann
Atty.

United States Patent Office 3,246,122
Patented Apr. 12, 1966

3,246,122
TEMPERATURE CONTROLLED SURFACE
HEATING UNIT
John W. Wetzel, Glen Ellyn, Ill., assignor to General
Electric Company, a corporation of New York
Filed Nov. 29, 1963, Ser. No. 326,986
6 Claims. (Cl. 219—450)

This invention relates to cooking appliances, and in particular to an electrical cook stove in which one of the top of stove heating units is provided with automatic control in which a temperature responsive element is in heat exchange relation with a cooking vessel placed on the unit.

Automatic temperature control for such heating units, which are known in the art as "surface cooking" units, is now widely used in electrical cooking ranges. All of the control systems now in use include a temperature sensing element which is placed at the center of the heating unit, and is spring biased or otherwise arranged to be brought resiliently into surface contact with the bottom of the cooking vessel. Some sensing elements have a fluid filling which expands or contracts according to whether it senses an increasing or decreasing temperature of the vessel; the fluid actuates a responsive device which in turn actuates a switch controlling the heating element. Other common forms are entirely electrical. In one widely used control the sensing element includes a resistance element having a definite temperature-resistance ratio; the change in resistance causes more or less current to flow to a resistance winding about a bi-metal switch. The bimetal switch in turn controls current flow to the actuating wire of a hot wire relay which comprises the power switch in the heating unit circuit. In all temperature control systems of which I am aware, the sensing element is protected against the radiant heat energy of the surrounding heating unit by one or more circular shields in an effort to make the temperature sensor responsive substantially only to heat flow from the cooking vessel itself.

In spite of such heat shielding, it is a common fault with these temperature controls that their exposure to the substantial heat energy radiated from the immediately surrounding heating coils results in an erroneous response; and although the temperature of the cooking vessel may be below the selected control temperature, the sensing element cycles the heating element. This, of course, delays the heating up of the cooking vessel, and the user experiences what she may feel is an extreme slowness in bringing the contents of a sizeable vessel to the boiling point or whatever cooking temperature had preselected.

The heating units of present day electrical cooking ranges are of the tubular sheathed resistance type in which the sheaths of two or more units are arranged in an interfitting flat spiral so as collectively to provide a plane surface on which the vessel is placed. Normally, the innermost turn of the spiral quite closely encircles the sensing element, thus exposing the element to radiant heat energy, resulting in the too-frequent cycling previously noted. It would seem obvious to correct this situation by forming the innermost turn or loop of the heating unit on a substantially larger radius, and thus to increase the air gap between the heating unit and the sensor. However, this is not commercially satisfactory, for it would provide only perimeter heating of a small size cooking vessel, and would require quite exact placement of such a vessel on the unit.

I have found that unexpectedly efficient sensing unit performance can be obtained when the center two or more coils of a relatively tightly spiraled cooking unit are occupied by a conductor which accommodates the maximum wattage rating of the unit with minimum resistance heating. For example, the terminal of the usual tubular sheathed resistance element comprises a relatively heavy steel rod which does not of itself generate any substantial heat during the passage of current therethrough. By extending such a terminal into the length of the sheath normally occupied by the resistance winding, the temperature of that portion of the sheath is substantially reduced, being, in fact, largely the result of heat flow from the "active" portion of the heating unit—that is, that portion surrounding the actual resistance winding. There is a progressively less sheath temperature from the end of the active portion to the end of the unit. Therefore, while there is not a complete absence of heat flow into the center portion of the bottom of a cooking vessel, the substantially reduced heat radiation from that part of the unit closely proximating the sensing element makes the sensing element much less likely to cycle the heating unit during the heating up portion of a cooking operation.

It is, therefore, an object of my invention to provide an improved relationship of a temperature sensing element and a cooking unit of the electrical resistance type.

It is another object of the invention to provide an improved electrical resistance heating element for a temperature controlled cooking appliance.

Other features and advantages of the invention will best be understood from the following detailed description of presently preferred embodiments read in connection with the accompanying drawings in which.

Figure 1:
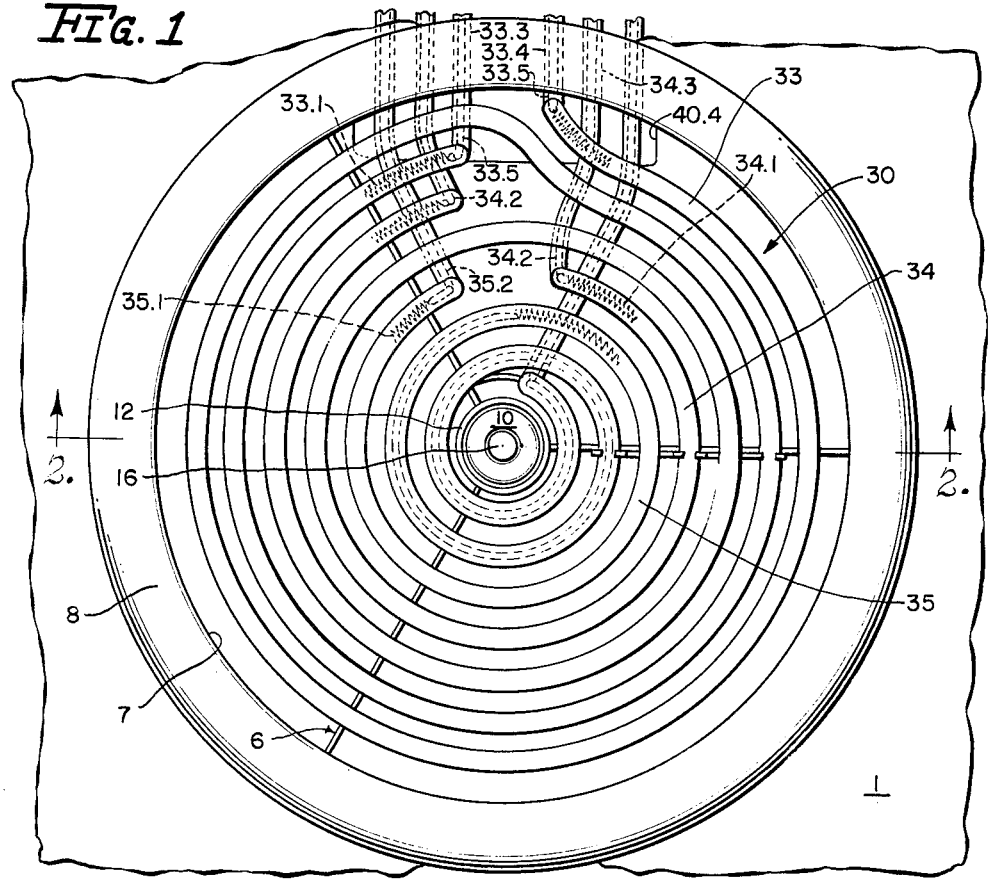
FIG. 1 is a fragmentary top plan view of a cooking appliance embodying a heating element constructed under the present invention.
Figure 3:
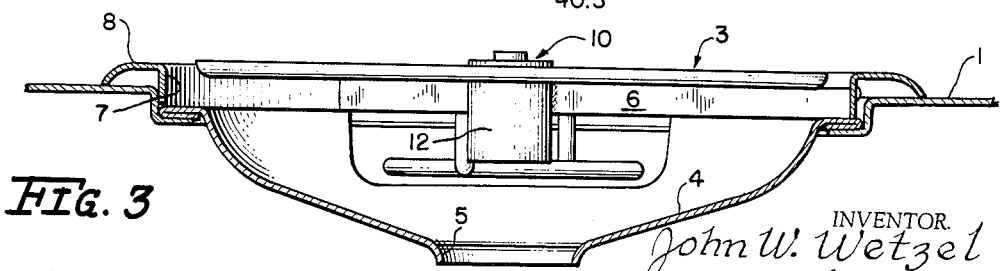
FIG. 3 is a sectional elevation similar to FIG. 2, but disclosing a conventional heating element and reflector pan.

Referring first to FIG. 3, the cooking top 1 of an electric range is provided with the usual flange structure 2 defining an opening within which is supported a surface cooking unit 3. In conventional range construction the flange structure 2 supports a reflector bowl 4, said bowl having an opening 5 through which spillage or boil-overs from a cooking vessel (not shown) on the unit passes to a suitable catch basin (not shown) below the cooking top. This structural arrangement has been in use for many years, and is well understood in the art. The heating unit itself may be as disclosed in Vallorani et al. U.S. Patent 2,662,158 granted December 8, 1953, for "Heating Unit and Method of Making the Same," and assigned to my present assignee. Specifically, and as shown in said patent, the surface cooking unit comprises one or more tubular sheathed heating elements in which a resistance wire is embedded in a mass of electrically insulating and thermally conducting material, such as finely divided magnesium oxide. This material is highly compacted within an external sheath of corrosion resistant metal. In present day electric ranges the surface unit may comprise one, two, or three of such heating elements arranged or intertwined in a flat spiral to provide a platform on which may be placed a cooking vessel in heat transfer relation therewith. As presently appears, the unit 3 of FIG. 3 embodies three heating elements. Except for the terminal dispositions latterly discussed, the heating elements may be arranged as shown in FIG. 1. When the respective coils of the heating unit are energized at maximum wattage across a 236-volt single phase, alternating current Edison system, the outside coil of the illustrated embodiment has a rating of 1420 watts, the middle coil is rated at 970 watts, and the inner coil at 810 watts, totaling 3200 watts for the complete unit under maximum service conditions.

Also, as shown in the said Vallorani et al. patent, the respective heating elements are supported on a spider such as the spider 6, the several legs of which pass through the vertical wall 7 of a trim ring 8; the trim ring and its associated spider rest on the peripheral flange of the reflector bowl 4, as clearly appears.

It is popular in contemporary electric ranges to equip one or more of the surface cooking units with temperature control means in which a temperature responsive element 10 is disposed at the center of the spirally arranged heating elements; said element 10 is appropriately spring biased to be maintained in heat transfer relation with the bottom of the cooking vessel. An external radiation shield 12 is arranged about the sensing element, and is usually secured to the legs of the spider 6 by some appropriate means. The shield 12 may also provide suitable support for the sensing element 10.

Figure 2:
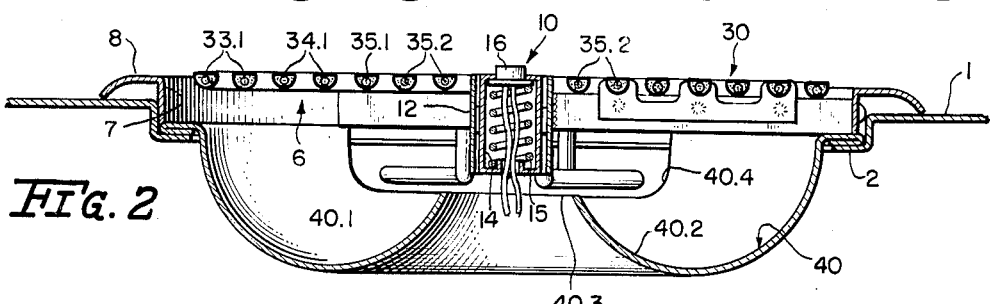
FIG. 2 is a sectional elevation taken on lines 2—2 of FIG. 1.

Referring now to FIGS. 1 and 2, the three-coil unit 30 therein disclosed is of identical basic construction as the unit 3 of FIG. 3 in that it is of tubular sheathed construction in which a helically wound resistance conductor is embedded in a tightly compacted mass of magnesium oxide. The two-convolution outer unit 33 is constructed in accordance with the conventional arrangement of FIG. 3; that is, its resistance wire helix 33.1 is embedded within highly compacted magnesium oxide and said resistance wire extends the full length of the cooking vessel supporting portion of the sheath. At the respective ends of the sheath where it projects downwardly and substantially radially to provide the terminal portions 33.3 and 33.4, the helix 33.1 is welded to a heavy rod-like terminal 33.5 whereupon the entire length of the element 33 on which a cooking vessel may rest is "active." Similarly, the middle unit 34 has the resistance conductor 34.1 connected at the extreme ends to the heavy rod-like terminal conductors 34.2 which extend into the sheath terminal portions 34.3.

The inner coil 35 departs from the conventional construction of the elements 33 and 34 by extending one of its heavy rod-like terminals, so that for a plurality of turns of the spiral immediately about the sensing element 10, the inner coil does not generate substantial resistance heat. As shown in FIG. 1, the resistance conductor 35.1 at one end of the element 35 connects to the terminal conductor 35.2 at the point where the sheath extends downwardly to provide the terminal portion of the unit. At the opposite end, however, the terminal conductor extends for substantially two turns of the heating element about the sensing element 10. The terminal conductors for each of the heating elements have such current-carrying capacity that they generate no appreciable resistance heat during the passage of the wattage for which the respective heating elements are designed. The outer element 33 and the middle element 34 remain at their standard wattage ratings of 1420 watts and 970 watts, respectively; but the limitation of the resistance conductor of the inner element 35 reduces its wattage to 385. As later appears, however, this reduction actually results in improved performance of the automatic control of the unit.

Also, as will later appear, the inner coil construction according to the present invention results in improved performance of the automatic control unit when the cooking unit arrangement of FIG. 1 is used with the conventional reflector bowl 4 of FIG. 3. However, even greater improvement in performance is realized when said cooking unit is used with the reflector bowl of FIG. 2. This reflector bowl 40 is substantially semi-toroidal in that a vertical section taken through the center of the bowl discloses two cups 40.1 and 40.2. The axial opening 40.3 is at a plane below the sensing unit shield 12, and has a larger diameter than said shield, whereby the heat radiated downwardly from the heating elements is in substantial measure reflected upwardly without impingement on shield 12.

Of course, the reflector bowl itself becomes heated during the operation of the unit, and the air in the space below the bowl becomes heated, and rises. The curvature of the bowl portions defining the opening 40.3 channels this rising air over the sensing element, serving to envelop the element in an atmosphere which appears to be quite stable in temperature relative to the variations in radiant heat energy issuing from the heating elements as said elements are cycled during the operation of the temperature control system.

The temperature control system used with the embodiments of FIGS. 1, 2 and 3 in a series of tests to determine relative performance was that sold under the trademark "Chef-O-Matic" by the King-Seeley Division of the King-Seeley Thermos Company of Ann Arbor, Michigan. These control systems are widely used in the cooking appliance industry, and it is believed unnecessary to describe the apparatus and its operation in detail. Briefly, however, the sensing element capsule 16 contains a resistor which is responsive to temperature changes; specifically, the resistor has a basic value of 20 ohms, plus or minus one percent, at 20° C., based on a .0047 ohm per ohm per degree centigrade temperature coefficient of the resistance wire and measuring current not in excess of two milliamperes. This resistance element is in series circuit with a potentiometer, the effective resistance of which is established by the user as she rotates a temperature setting dial (not shown) to whatever dial designation is appropriate to the cooking operation to be performed. The resistance element and potentiometer are in electrical series relation with the actuating wire of a hot wire relay, and with a resistance wire winding of a thermometal responder switch. Power for the control circuit is supplied at 10 volts from the low voltage side of a transformer. Current flow through the responder switch winding causes the thermometal element of the switch to cycle switch contacts which in turn control the passage of current through the actuating wire of the hot wire relay. As this wire heats with the passage of current therethrough it elongates and the power contacts of the relay close. As the sensor resistance changes with increase in the temperature which the sensor "feels," the current flow through the thermometal switch winding causes the thermometal to warp in a direction opening its contacts. The relay wire cools and contracts, opening the relay contacts to interrupt the current supply to the cooking unit. Each of the elements of the cooking unit is in parallel electrical relationship so that each is energized across 230 volts when the relay contacts are closed. The electrical values of the respective control elements are such that the heating elements remain energized until the temperature of the sensing element resistor reaches about 100° F. below the specific control temperature selected by the cook, whereupon the circuit to the actuating wire of the hot wire relay is broken, the actuating wire thereof cools and contracts, and the power contacts of the hot wire relay open to interrupt the high voltage circuit of the heating elements. From this point up to the selected temperature, the control will pulse at a variable on-off power ratio governed by the changing resistance in the sensing element. During a boiling operation the sensing temperature is constant (as determined by barometric pressure) and the sensor resistance remains constant. The control then becomes a power control rather than a temperature control. For a more complete explanation of the control circuit and its operation, reference is made to "Home Appliance Builder," issue of November 1963, pages 18 and 19 of which are devoted to an article entitled "Improved Control System for Electric Ranges" by Rudy Bergsma, Chief Engineer, King-Seeley Division, King-Seeley Thermos Co.

As indicated above, the cycling of the heating elements of the cooking unit begins when the temperature of the sensing element reaches about 100° F. below the control setting selected by the cook. In view of the fact that during the heating up period the sensing element in the conventional arrangement of FIG. 3 is exposed to substantial heat energy radiated by the immediately surrounding heating element, the sensor receives a "reading" which is not in fact solely the temperature of the bottom of the cooking vessel. The cycling of the cooking unit heating elements therefore begins sooner than it should, and it takes a correspondingly longer time for the cooking vessel to reach the control point. Actual comparative test data established the following time relationships:

| Electrical System (King-Seeley Chef-O-Matic control in all tests) | Cooking Unit Power Available | Time to raise 2 qts. of water to and settle at 200° F. | Time to raise 4 qts. of water to and settle at 200° F. |
|---|---|---|---|
| Conventional arrangement of Fig. 3. | 3,200 watts | 10.7 min | 24.5 min. |
| Heating element arrangement of Fig. 1, standard reflector bowl of Fig. 3. | 2,775 watts | 7.8 min | 10.03 min. |
| Heating element arrangement of Fig. 1, reflector bowl of Fig. 2. | 2,775 watts | 6.9 min | 14.7 min. |

Contrary to normal expectation, therefore, a temperature controlled surface cooking element with substantially less wattage than similarly equipped conventional cooking units, produces faster heating of the indicated volumes of water. Performance improvement is noted even when the conventional reflector bowl is used below the unit.

While there has been described what is at present thought to be a preferred embodiment of the invention, it will be understood that various modifications may be made therein, and it is intended to cover in the appended claims all such modifications which fall within the true spirit and scope of the invention.

I claim:

1. A cooking appliance, including, in combination, an electrical heating element having an electrical resistance wire within a tubular sheath disposed in a flat spiral embodying a plurality of turns of increasing radius to provide for heat distribution over the bottom of a cooking vessel placed thereon, a temperature sensing element disposed within the central portion of the spiral to be enclosed thereby, at least the first two turns of the spiral closest to the sensing element being devoid of said resistance wire whereby said spiral portion receives substantially only heat conducted from portions of the spiral more remote from the heating element, and means for biasing said sensing element for resilient heat exchange contact with the bottom of a cooking vessel placed on said unit.

2. The combination according to claim 1, further including means for connecting said resistance wire to a source of electrical energy.

3. A cooking appliance, including, in combination:
   (a) at least one electrical heating element comprising an electrical resistance conductor within a tubular sheath arranged in a flat spiral embodying a plurality of turns to provide a platform adapted to support a cooking vessel in heat transfer relation therewith;
   (b) electrical terminal means connected to the ends of the resistance conductor for connection thereof to an electric power source;
   (c) a temperature sensing device positioned centrally of the heating element and disposed for heat exchange contact with the bottom of a cooking vessel placed on said platform; and
   (d) at least the first turn of the spiral closest to said sensing element being devoid of said resistance wire whereby said spiral portion about said sensing element receives substantially only heat conducted from portions of the spiral more remote from said sensing element, said sensing element thereby being responsive primarily to temperature change of the bottom of the cooking vessel placed on the heating element.

4. The combination according to claim 3 further including means for biasing said sensing element for resilient heat exchange contact with the bottom of a cooking vessel placed on said unit.

5. The combination according to claim 3 further including a second heating element comprising an electrical resistance conductor within a tubular sheath arranged in a flat spiral extending about said first heating element to provide therewith a platform adapted to support a cooking vessel in heat transfer relation therewith.

6. A cooking appliance, including, in combination:
   (a) a first electrical heating element comprising an electrical resistance conductor within a tubular sheath arranged in a flat spiral embodying a plurality of turns;
   (b) a second such heating element disposed in a similar flat spiral extending about said first named element to provide therewith a platform adapted to support a cooking vessel in heat transfer relation therewith;
   (c) electrical terminal means connected to the ends of the respective resistance conductors for connection thereof to an electric power source;
   (d) a temperature sensing device disposed within the innermost spiral of the first named heating element and including a sensor resiliently biased to assume a normal position above the plane of said element; and
   (e) at least the first turn of the spiral closest to said sensing element being devoid of said resistance wire whereby said spiral portion about said sensing element receives substantially only heat conducted from portions of the spiral more remote from said sensing element, said sensing element thereby being responsive primarily to temperature change of the bottom of the cooking vessel placed on said platform.

References Cited by the Examiner

UNITED STATES PATENTS

| 2,662,158 | 12/1953 | Vallorani | 219—455 |
| 2,772,340 | 11/1956 | Schroeder | 219—450 |
| 2,820,129 | 1/1958 | Long et al. | 219—450 |

RICHARD M. WOOD, *Primary Examiner.*

L. H. BENDER, *Assistant Examiner.*